Figure 1:
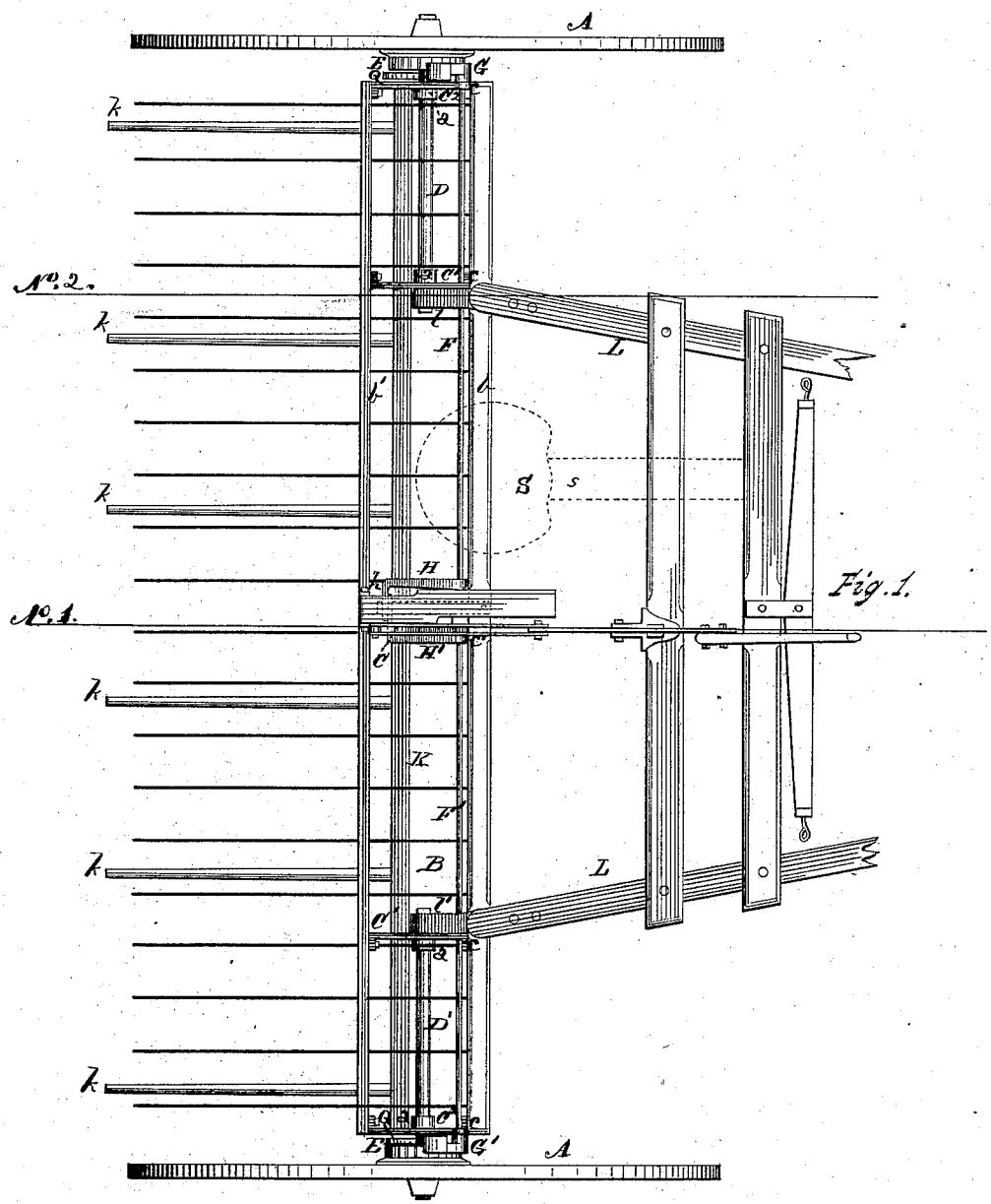

(No Model.) 2 Sheets—Sheet 1.

J. La DOW.
Horse Hay Rake.

No. 237,553. Patented Feb. 8, 1881.

Witnesses. Charles Selkirk, Richard P. Dumay

John La Dow, Inventor.
by his attorney
Alex. Selkirk

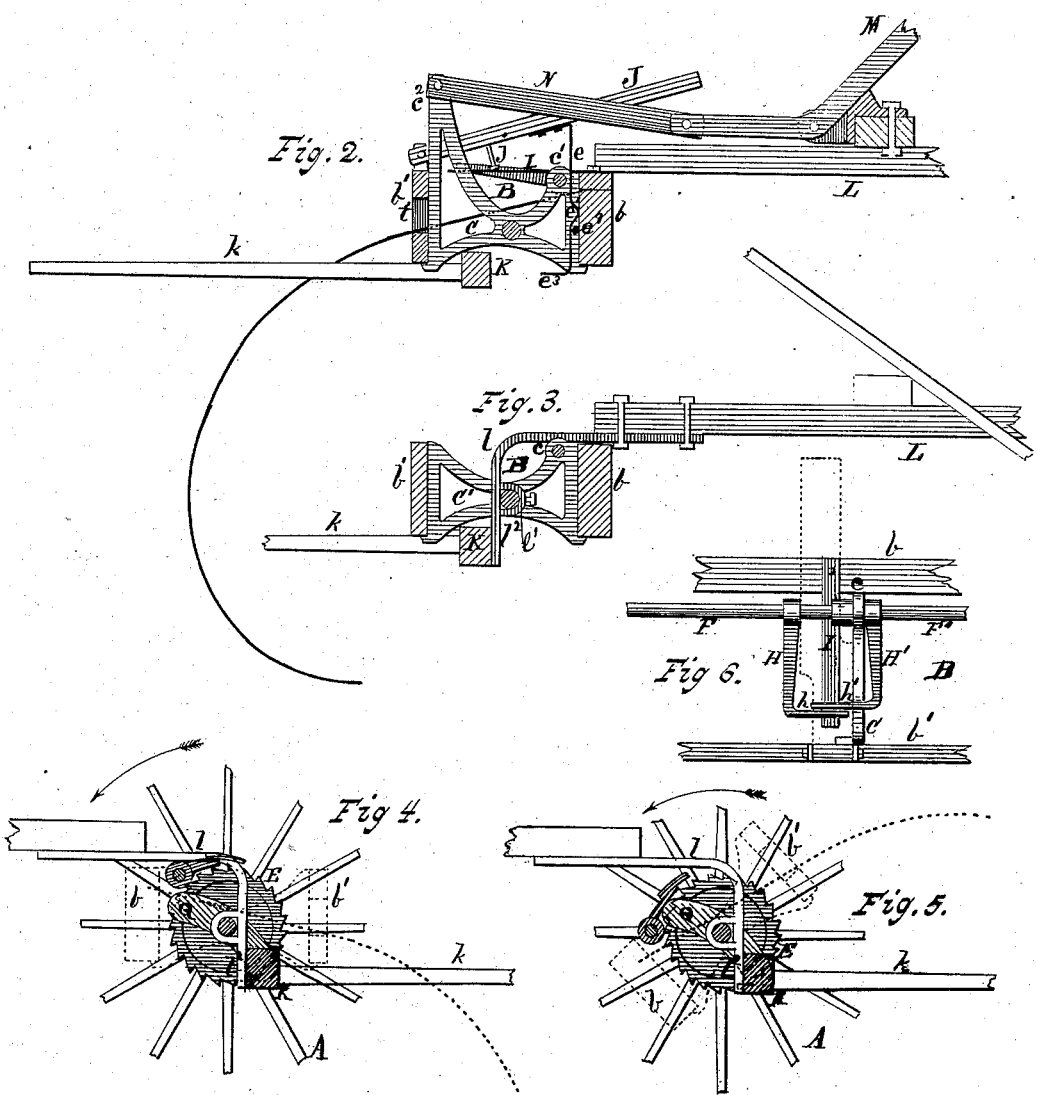

UNITED STATES PATENT OFFICE.

JOHN LA DOW, OF ALBANY, NEW YORK, ASSIGNOR OF ONE-HALF TO OLIVER H. P. CORNELL, OF SAME PLACE.

HORSE HAY-RAKE.

SPECIFICATION forming part of Letters Patent No. 237,553, dated February 8, 1881.

Application filed September 27, 1880. (No model.)

*To all whom it may concern:*

Be it known that I, JOHN LA DOW, of the city and county of Albany, State of New York, have invented certain new and useful Improvements in Horse Hay-Rakes, of which the following is a specification.

My invention relates to a horse hay-rake in which the tooth-head and pressure or lifting bar are about balanced and oscillate from spindles in carrying-wheels provided with ratchet-wheels, which ratchet-wheels are made to engage with pawls attached to the balanced head-rake by means of mechanism which the driver may readily set in operation, so as to cause the teeth to be elevated to discharge the load, and mechanism, also provided, will operate, at the finish of the oscillation of the rake-head, to release the pawls from engagement with the ratchet-wheels, so that the rake-head will oscillate back to its normal position for gathering the hay.

The objects of my invention are to produce, in a horse hay-rake, a balanced oscillating rake-head which will be readily operated by either the driver or the horse; also, to provide mechanism for causing the rake-teeth to be elevated by the revolving of the carrying-wheels when the rake is being drawn forward, or being turned to the right or the left, and, when the load is discharged, to cause the revolving wheels to operate to effect an automatic return of the teeth to a raking position. I attain these objects by means of the mechanism illustrated in the accompanying drawings, in which—

Figure 1 represents a plan view of my improved horse-rake. Fig. 2 is a sectional elevation of the same, taken at line No. 1 in Fig. 1. Fig. 3 is a sectional elevation taken at line No. 2 in Fig. 1. Fig. 4 is an elevation illustrating the mechanism which is operated by the carrying-wheels for elevating the rake-teeth for discharging the load, and for tripping the rake-head for the return of the teeth to a raking position, and illustrates said mechanism when not in operation. Fig. 5 is an elevation of the same, showing the mechanism in active operation to effect a return of the teeth to a raking position. Fig. 6 represents a plan view of the mechanism for causing the mechanism shown in Fig. 4 to be brought into active operation.

Similar letters refer to similar parts throughout the several views.

In the drawings, A represents the carrying-wheels, which wheels support a balanced rake-head, B, composed of the tooth-bar $b$ and pressing and lifting bar $b'$, which bars are held in connection by the connecting-pieces C C' C², securely bolted to said pieces. Of these connecting-pieces I prefer to employ five, one of which, C, is placed at a point about the middle of the length of the said head, and of the others, C' C' are each set at a distance off from the said connecting-piece C, while the pieces C² C² are placed at the ends of the rake-head, as shown in Fig. 1. Made with the connection-pieces C' and C² are sleeves $a$, which receive and hold short cylindrical bars D D, the outer ends of which form the pintles or axle on which the carrying-wheels revolve. Secured to or made solid with the rear side of the hubs of the said carrying-wheels are ratchet-wheels E, which have their teeth pointing in the direction of their revolution, as shown in Figs. 4 and 5.

Held in suitable bearings, $c$, Figs. 1, 2, 3, and 4, are sectional shafts F F', which shafts are preferably situated at the rear side of the tooth-bar $b$, and are free to revolve in their bearings $c$, while their inner ends are contiguous and held in the bearings $c'$, made with the middle connecting-piece, C, and their outer ends are made to project outward and past the end connecting-pieces, C², and to a point opposite the face of the ratchet-wheels E. Secured to each of said outer ends of said sectional shafts are pawls G G', which pawls are arranged about horizontal, as shown in Fig. 4, when not in action with the ratchet-wheels. Secured in a rigid manner to the inner ends of the said sectional shafts F F' (which shafts I denominate "pawl-shafts") are levers H H', which levers overbalance the weights of the pawls G G', and give motion to the pawl-shafts F F' and said pawls, accordingly as the outer ends of said levers rise or fall.

The said levers are supported in horizontal positions, as shown in Figs. 1 and 6, by their limbs $h\ h'$ resting on the elastic supporting-bar I, which bar is secured by one of its ends to the tooth-bar b of the rake-head, while its opposite end is unsupported and free to be depressed. Hinged from the pressure or lifting bar b', and directly over the same, is a depressing-lever, J, provided with downwardly-projecting piece j, which rests on the upper surface of the elastic bar I; also, secured to said lever from its lower side is the elastic catch e e', (shown in Fig. 1.) Secured to the tooth-bar b is a catching-tooth, $e^4$, which tooth, bearing against the lower side of the catch e', holds the depressing-lever up, and when said lever is depressed, catch e' will slip down and pass tooth $e^4$, and the latter will engage with the upper side of the former and hold said lever depressed.

Made continuous with the elastic catch e e', and extended to a distance below the same, is trip $e^3$, which trip, when the rake-head is fully tilted to position of dotted lines in Fig. 5, will strike the bar K, carrying the cleaner-rods k, and force the catch e' up past tooth $e^4$, when the depressing-lever will assume its normal position. Secured to the ends of the cleaner-bar K, and in a vertical range with pawls G G', are the tripping-cams Q Q, which cams will throw the pawls out of engagement with the ratchet-wheels when the rake-head is fully tilted.

The shafts L are provided with goose-neck draw-irons l, provided with eyes l', as shown in Fig. 3, which eyes receive the inner ends of the cylindrical bar D, which may freely turn within said eyes. Thus connected, the shafts are securely hinged to the rake-head, and the latter may be freely oscillated in either direction without affecting the thills or the mechanism they carry. The middle connection, C, of the bars b b' has its rear end limb extended upward, so as to form an upright arm, $c^2$, by which the rake-head will be oscillated by lever M, through the connecting rod or link N, accordingly as said lever M is moved.

Made with each goose-neck thill-iron l, and projecting below the eyes of the same, is a bracket, $l^2$, to which is secured bar K, carrying the rearwardly-projecting clearer-rods k, which bar and its clearer-rods are held in the same position by the thills.

S is the seat, supported by standard s from the cross-bars of the thills.

The manner in which the several parts of my improved rake operate is as follows: When the several operating parts are in their normal positions, as shown in Figs. 1, 2, and 4, the teeth will be in position for gathering the hay, and the driver, sitting on seat s, will lightly bear on the lever M with his foot and press it forward, when said lever, through connecting-link N and upright arm $c^2$, will tilt the rake-head back and cause bar b' to press the points of the gathering-teeth T down to their work on the ground. The said teeth are each pivoted in the tooth-bar b, so as to have an independent motion, and may rise and fall in the tooth-slot t, made in bar b', as they meet, and pass depression and elevation on the surface of the ground. As the rake is drawn forward by the thills their pivoted connection with the rake-head will permit the said rake-head to be freely tilted or oscillated by its spindles D D', turning in the carrying-wheels, for which wheels the said spindles operate as axles. The shafts or thills L being situated above the plane of the upper side of the bars b b', composing the rake-head, increases the capacity of the rake in its vertical direction between the ground and its rake-head, and effects a removal of all obstruction for forming a large windrow, and also permits the load to be gathered to form up to the rake-head, while the forward portion of the rake-head, when oscillated downward, will be made to move from said thills instead of toward the same, as has before been practiced. When a sufficient quantity of hay has been gathered and it is desired to discharge the load, the driver will place his foot on the free end of lever J and press it downward, together with the projecting piece j, which piece will force the elastic bar I downward, when the pawl-levers H H' will, by their own weight, follow said depressed bar until said levers have each turned their respective pawl-shafts F F' to a sufficient distance to carry the pawls G G' into engagement with their respective ratchet-wheels E E'. The rake being continued to be drawn forward and the carrying-wheels continuing to revolve, the ratchet-wheels will work against their pawls and force the rake-head B to be tilted from position shown by full lines in Fig. 2 and dotted lines in Fig. 4 to that shown by dotted lines in Fig. 5, when the teeth will be elevated and the load of hay discharged.

When the lever J has been depressed, the elastic catch e e' will be forced down so that the catch portion e' will be made to engage with the tooth $e^4$ from its lower side, and said lever will be held in a depressed position in relation with the rake-head, and be made to hold the elastic supporting-bar I also depressed, so that the pawl-levers H H' will be permitted, by reason of their weight, to hold the pawls in engagement with the ratchet-wheels. While the said levers are thus depressed by their own gravity, and are made thereby to hold their respective pawls in engagement with the ratchet-wheels, each ratchet-wheel is permitted to slip in a backward direction from active engagement with its pawl, as its carrying-wheel is made to revolve faster than the other, and as soon as both carrying-wheels resume their revolutions in unison, each pawl will have a proper and sure engagement with its ratchet, and thereby be made to do equal work.

As before stated, when lever J is depressed the catch e' will be carried down past tooth $e^4$ and hold said lever in effective action with the elastic bar I, so that the pawl-levers H H' will continuously hold their pawls in engagement with the ratchet-wheels while the carrying-wheels are revolving forward. The said catch $e'$, by thus holding lever J down, will cause the pawls to continue in active engagement with the ratchet-wheels until the said catch is released. This release is effected by the trip $e^3$, connected with said catch, striking against the cleaner-bar K when the rake-head is fully tilted, and thereby forcing the said catch up past tooth $e^4$, when the supporting-bar I will be released of its pressing force and spring up and carry the levers H H' upward, and thereby cause the pawls to be carried out of engagement with the ratchet-wheels. About at the same moment that the catch-trip $e^3$ forces the release of the depressing-levers H H', the rake-head will be so tilted forward and downward that the pawls will be carried against the upper edge of the tripping-cams, and be thereby forced out of engagement with the ratchet-wheels. The catch $e'$ being above the tooth $e^4$, the elastic bar I will hold the said pawls free from said ratchet, and the rake-head will instantly fall and resume its normal position.

When the points of the teeth are to be held down to the ground, the driver will with his foot force lever M forward, when the connecting-link N will be made to operate with the arms $c^2$ and force it rearward, so as to tilt the rake-head back and downward, when the pressure-bar $b'$ will be made to bear down on the backs of the teeth and hold them to their work.

The arm $c^2$ being attached to the pressure and lifting bar $b'$, and extended a short distance above the same, and the thills being situated above the plane of the upper side of the rake-head and carrying lever M, formed as shown, causes the connecting-bar N to form with the short end of said lever a toggle-jointed lever, the limbs of which toggle-lever so formed will nearly coincide in their lines when said limbs are straightened out to cause pressure to be exerted downward on the pressure-bar $b'$ through arm $c^2$, so that the driver will be required to exert but little force on lever M to effect a holding down of the teeth to their work.

It will be readily observed that the balanced head, composed of bars $b\ b'$ and their connecting-pieces, is horizontally swiveled in direction of its length with both the carrying-wheels and thills, and in coincident axial lines by reason of the cylindrical bars D D', so that the said rake-head will be adapted to be readily tilted in either direction when but little force is applied.

It will be further observed that as the axial lines of the bars D D' are at a considerable distance below the plane of the jointed connection of the upright arm $c^2$ with the lever M and its connecting-link N, the operator will be required to exert but little force to effect a holding down of the points of the gathering-teeth to the ground.

It will also be readily observed that when it is desired to dump the rake by the force exerted by the horse the driver is required only to press the depressing-lever J down so that the catch $e'$ will engage with tooth $e^4$, when the operating parts before described will, by automatic operations, cause the several respective parts to be brought into effective operation to first cause an elevation of the rake-teeth and a discharge of the load, and next a return of the several parts to their normal positions.

Having described my invention, what I claim, and desire to secure by Letters Patent, is—

1. In a horse-rake, the means for depressing the tooth-bar and elevating the lifting or pressure bar of a balanced rake-head, consisting of ratchet-wheels E E', attached to the carrying-wheels of the rake, shafts F F' and pawls G G', carried by the balanced rake-head, and levers H H', secured to said shafts and extending horizontally from the same, so that said levers, by their own and sole gravity, will cause said pawls to engage with said ratchet-wheels, as set forth.

2. In a horse-rake, the means for holding pawls from engagement with ratchet-wheels attached to the carrying-wheels of a rake, consisting of shafts F F', having said pawls secured to their outer ends, and levers H H', secured to their inner ends and extending horizontally from the same, and the elastic arm or spring I, secured at one end to the rake-head, and extending horizontally from the same and supporting said horizontal levers, substantially as set forth.

3. In a horse hay-rake, the combination, with the elastic supporting-bar I, operating with the pawl-levers H H', of the lever-cap J and projecting bearing-piece $j$, substantially as and for the purpose set forth.

4. The combination, with the lever-cap J, of the elastic catch $e\ e'$ and tooth $e^4$, substantially as and for the purpose set forth.

5. The combination, with the lever-cap J, hinged to a tilting rake-head and provided with the elastic catch $e\ e'$, operating with the tooth $e^4$, of the trip $e^3$, connected with said elastic catch, and the bar K, held stationary when said rake-head is tilted, substantially as and for the purpose set forth.

6. In a horse-rake provided with a balanced rake-head which is oscillated forward by ratchet-wheels attached to the carrying-wheels, and pawls attached to said rake-head for dumping the rake, the combination, with said pawls, of tripping-cams Q Q, held from oscillation, horizontal levers H H', operating said pawls, and the elastic arm I, supporting the free ends of said levers and lifting them from a lower to a higher plane for coaction with said tripping-cams, whereby the said rake-head will be free to oscillate back to its normal position, substantially as set forth.

JOHN LA DOW.

Witnesses:
CHARLES SELKIRK,
RICHARD P. DUMARY.